United States Patent [19]

Han

[11] Patent Number: 5,511,954
[45] Date of Patent: Apr. 30, 1996

[54] WATER PUMPING SYSTEM USING SOLAR ENERGY

[76] Inventor: Tai-kang Han, 2nd Fl., No. 18, Lane 787, Sec. 2, Kuo Kwang Rd., Tai Li Hsiang, Taichung Hsien, Taiwan

[21] Appl. No.: 494,415

[22] Filed: Jun. 26, 1995

[51] Int. Cl.⁶ .................................................. F04F 1/18
[52] U.S. Cl. ............................................ 417/121; 417/209
[58] Field of Search ...................................... 417/208, 209, 417/52, 121, 118

[56] References Cited

U.S. PATENT DOCUMENTS

| | | | |
|---|---|---|---|
| 4,309,148 | 1/1982 | O'Hare | 417/209 X |
| 4,801,246 | 1/1989 | Baumberg | 417/121 |
| 5,351,488 | 10/1994 | Sorensen | 417/208 |

FOREIGN PATENT DOCUMENTS

| | | | |
|---|---|---|---|
| 57-135300 | 8/1982 | Japan | 417/208 |

*Primary Examiner*—Richard E. Gluck
*Attorney, Agent, or Firm*—Merchant, Gould, Smith, Edell, Welter & Schmidt

[57] ABSTRACT

A water pumping system includes a solar collector assembly having a plurality of solar collectors containing a heat transfer medium therein. A circulating tube is mounted in an insulated housing and communicates with the solar collectors for conveying the heat transfer medium to circulate therethrough such that water received in the insulated housing is evaporated to vapor by means of the heat transfer medium. A receiver is provided for receiving the vapor created in the insulated housing therein. A pressure chamber communicates with the water source for conveying water contained in the water source into the pressure chamber. A conduit communicates between the pressure chamber and the receiver for conveying the vapor received in the receiver into the pressure chamber so as to force water contained in the pressure chamber into the container via a conveying tube.

5 Claims, 3 Drawing Sheets

5,511,954

WATER PUMPING SYSTEM USING SOLAR ENERGY

BACKGROUND OF THE INVENTION

1. Field of Invention

The present invention relates to a water pumping system, and more particularly to a water pumping system using solar energy.

2. Related Prior Art

A conventional solar collector is used to heat water for general use such as, bathing, washing, and the like. There is no suggestion to utilize the solar collector in a water pumping system for delivering water from a water source to a container such as a tower and the like at a higher level than that of the water source.

The present invention has arisen to mitigate and/or obviate the disadvantage of the conventional solar collector.

SUMMARY OF THE INVENTION

The primary objective of the present invention is to provide a water pumping system for delivering water from a water source to a container such as a tower and the like at a higher level than that of the water source.

In accordance with one aspect of the present invention, there is provided a water pumping system comprising a solar collector assembly including at least one solar collector containing therein a heat transfer medium with a high temperature. A heating module includes an insulated housing having water received therein. A circulating means is mounted in the insulated housing and communicates with the at least one solar collector for conveying the heat transfer medium of a high temperature in the at least one solar collector to circulate through the circulating means such that the water received in the insulated housing is evaporated to vapor with a high pressure by means of the heat transfer medium.

A receiver communicates with the insulated housing for receiving the vapor created in the insulated housing therein. At least one pressure chamber is located at a level between the container and the water source and communicates with the water source by means of a water pipe for conveying water contained in the water source into the at least one pressure chamber. A conveying tube has a first end mounted on an underside of the at least one pressure chamber and a second end connected to the container.

A conduit communicates between the at least one pressure chamber and the receiver for conveying the vapor received in the receiver into the pressure chamber so as to force water contained in the at least one pressure chamber into the container via the conveying tube. A one-way valve is mounted on the conduit between the at least one pressure chamber and the receiver.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
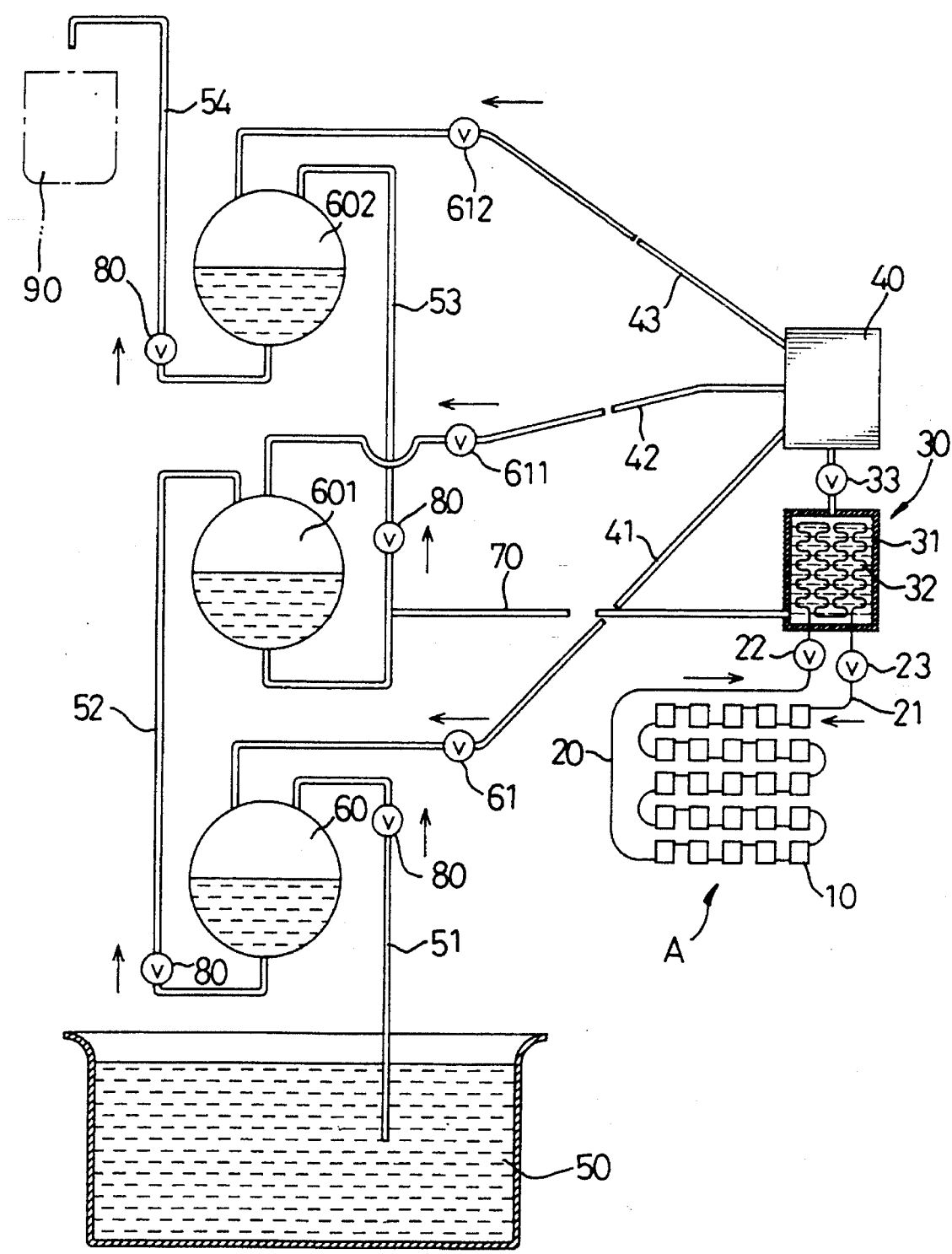
FIG. 1 is a front plan cross-sectional view of a water pumping system in accordance with the present invention.
Figure 2:
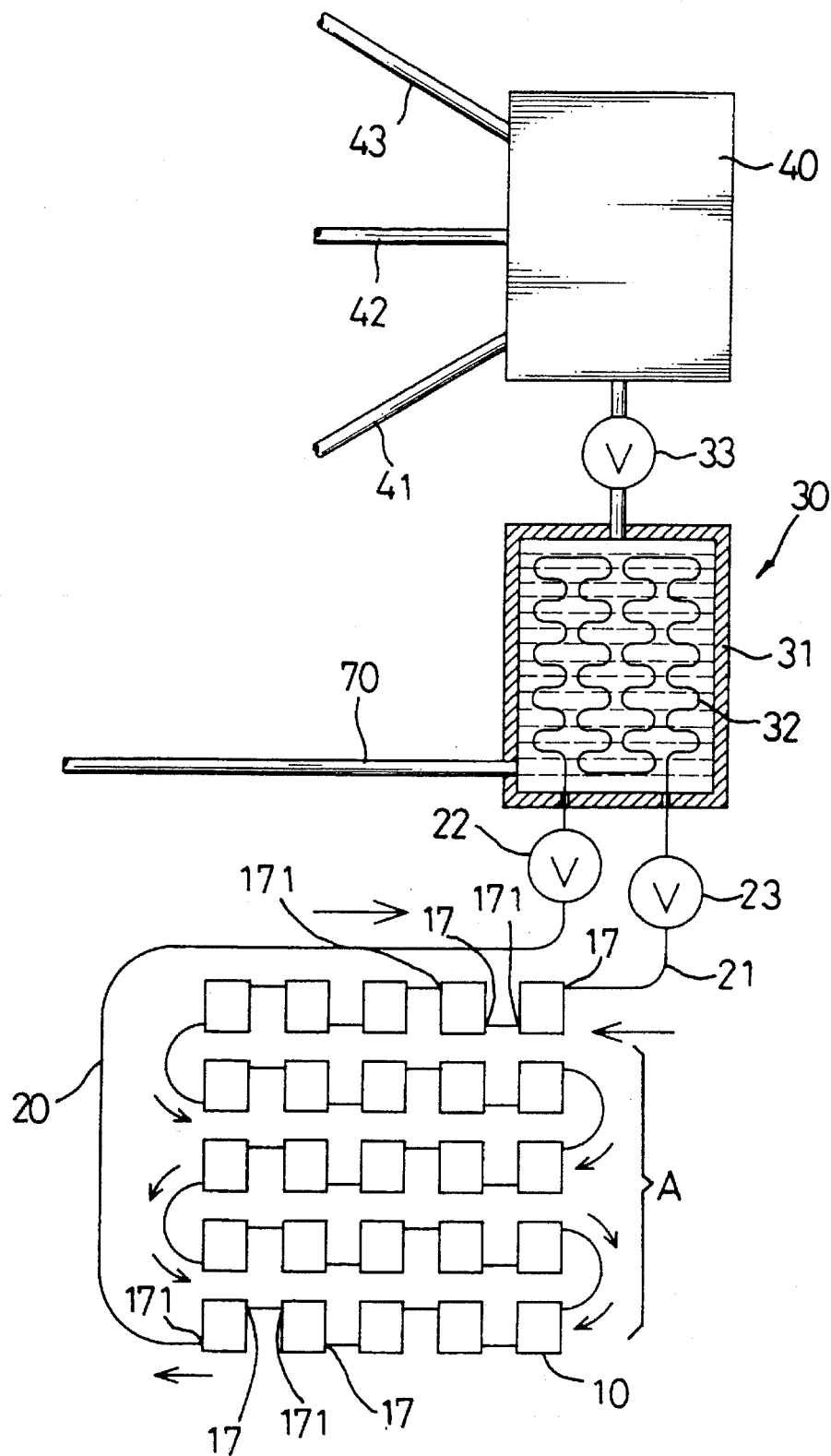
FIG. 2 is a partially enlarged view of the water pumping system as shown in FIG. 1.

Referring to the drawings, and initially to FIGS. 1 and 2, a water pumping system in accordance with the present invention is provided for delivering water from a water source 50 on the ground to a container 90 such as a tower and the like at a higher level than that of the water source 50.

The water pumping system comprises a solar collector assembly A which includes a plurality of solar collectors 10 each containing therein a heat transfer medium with a high pressure and temperature. A heating module 30 includes an insulated housing 31 having water fully received therein. A circulating tube 32 with a winding configuration is mounted in the insulated housing 31 and communicates with the solar collector assembly A for conveying the heat transfer medium in the solar collectors 10 to circulate through the circulating tube 32 such that the water received in the insulated housing 31 is evaporated to vapor with a high pressure and temperature by means of the heat transfer medium. A receiver 40 communicates with the insulated housing 31 for receiving the pressurized vapor created in the insulated housing 31 therein. Preferably, a one-way valve 33 is mounted between the receiver 40 and the insulated housing 31.

Three pressure chambers 60, 601 and 602 are located at a level between the container 90 and the water source 50 and are connected to the receiver 40 via conduits 41, 42 and 43 respectively. A conveying tube 70 communicates between the pressure chamber 601 and the insulated housing 31 for conveying water contained in the pressure chamber 601 into the insulated housing 31.

A water pipe 51 is connected between an upper portion of the pressure chamber 60 and the water source 50 for conveying water contained in the water source 50 into the pressure chamber 60. A conveying tube 52 has a first end mounted on an underside of the pressure chamber 60 and a second end connected to an upper portion of the pressure chamber 601. A conveying tube 53 has a first end mounted on an underside of the pressure chamber 601 and a second end connected to an upper portion of the pressure chamber 602. A conveying tube 54 has a first end mounted on an underside of the pressure chamber 602 and a second end connected to the container 90.

The conduits 41, 42 and 43 are provided for conveying the vapor received in the receiver 40 into the pressure chambers 60, 601 and 602 so as to pressurize and force water contained in the pressure chambers 60, 601 and 602 into the container 90 via the conveying tubes 52, 53 and 54.

Preferably, one-way valves 61, 611 and 612 are respectively mounted on the conduits 41, 42 and 43 between the receiver 40 and the pressure chambers 60, 601 and 602. In addition, one-way valves 80 are respectively mounted on the tubes 51, 52, 53 and 54 between the water source 50, the pressure chambers 60, 601 and 602, and the container 90.

Figure 3:
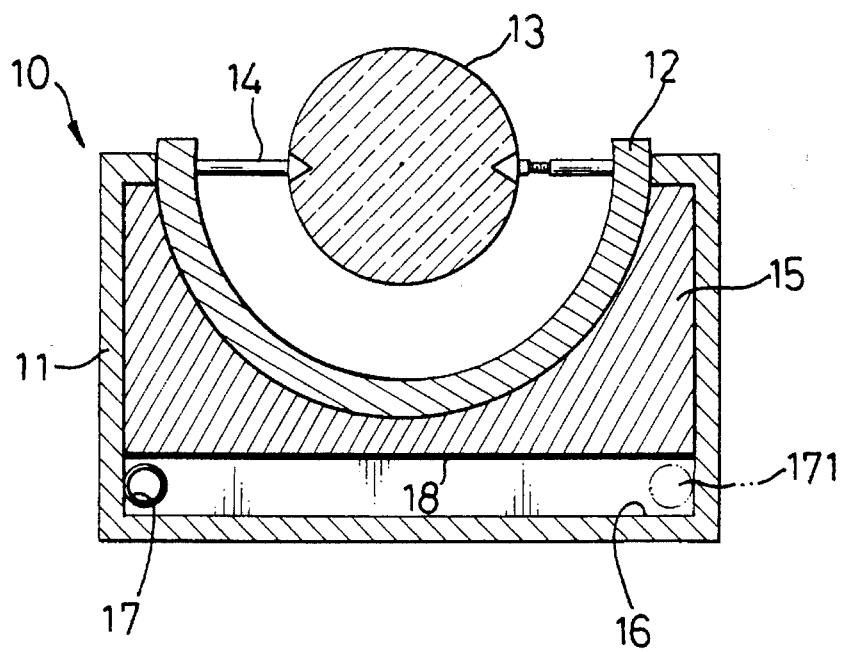
FIG. 3 is a front plan cross-sectional view of a solar collector in accordance with the present invention.
Figure 4:
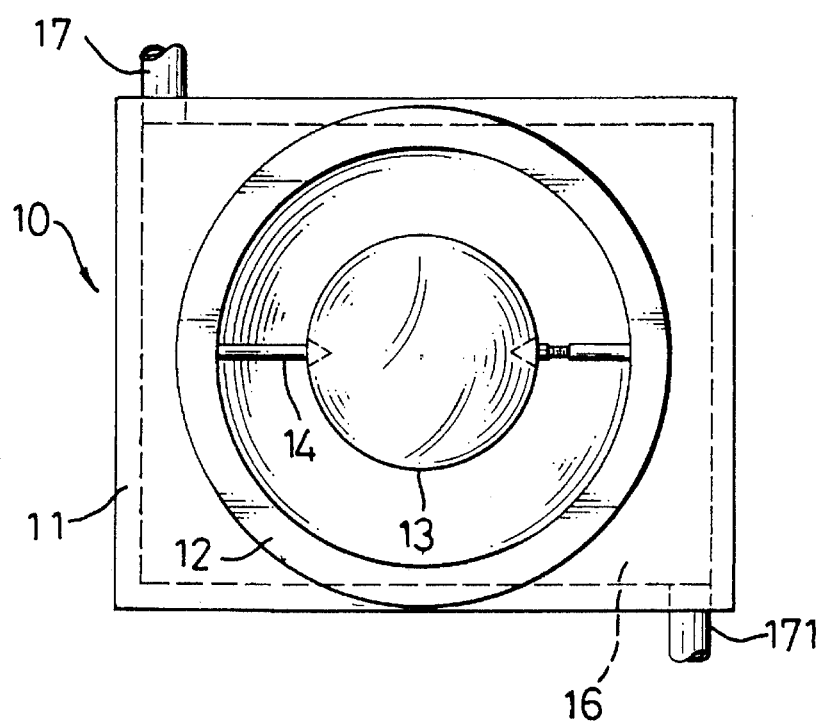
FIG. 4 is a top plan view of the solar collector as shown in FIG. 3.

Referring to FIGS. 3 and 4, each of the solar collectors 10 comprises an insulated casing 11 of a substantially rectangular section including an open upper surface and a closed lower surface. A concave heat receiver 12 of a hemispherical configuration is mounted around the open upper surface of the insulated casing 11, thereby sealing the insulated casing 11 for receiving solar energy.

Two supporting rods 14 each are respectively mounted on an inner periphery of the concave heat receiver 12 and radially and inwardly face with each other. A transparent sphere 13 made of glass is securely mounted between the two supporting rods 14 and is partially encircled in the concave heat receiver 12 for refracting incidental sunlight.

A plate wall 18 made of a heat-conducting material is mounted in the insulated casing 11 between the upper surface and the lower surface thereof, thereby defining a first chamber 15 provided with a heat absorbing material therein between the concave heat receiver 12 and the plate wall 18, and a second chamber 16 filled with the heat transfer medium therein between the plate wall 18 and the lower surface of the casing 11. An inlet 17 and an outlet 171 are respectively mounted in the second chamber 16 and extend outwardly therefrom.

By such an arrangement, incidental sunlight is projected though the transparent sphere 13 onto the heat receiver 12. The solar energy is then transferred from the heat receiver 12 through the heat absorbing material in the first chamber 15 into the second chamber 16 via the plate wall 18 such that the heat transfer medium contained in the second chamber 16 is heated and pressurized by the solar energy and is able to flow through the inlet 17 and the outlet 171 to surroundings.

In operation, referring to FIGS. 1–3, a group solar collector assembly comprises a plurality of solar collectors 10 connected serially with each other. The inlet 17 of each of the plurality of solar collectors 10 is connected with the outlet 171 of the adjacent solar collector 10. In addition, the inlet 17 of a first solar collector 10 is connected to a first distal end of the circulating tube 32 through a return tube 21 and the outlet 171 of a last solar collector 10 is connected to a second distal end of the circulating tube 32 through an inlet tube 20. One-way valves 22 and 23 are respectively mounted on the inlet and return tubes 20 and 21.

By such an arrangement, the pressurized heat transfer medium with a high temperature in the second chamber 16 of each of the solar collectors 10 is able to travel forwardly in a direction of the arrows as shown in FIG. 2 via inlets 17 and outlets 171. The heated and pressurized heat medium is then conveyed from the outlet 171 of the last solar collector 10 into the circulating tube 32 through the inlet tube 20 and is conveyed away from the circulating tube 32 through the return tube 21 into the inlet 17 of the first solar collector 10, thereby permanently repeating the above-mentioned circulating process. The heat transfer medium is prevented from traveling in a reverse direction by means of the one-way valves 22 and 23.

The water received in the housing 31 is continuously heated and pressurized by the heat transfer medium circulating through the circulating tube 32, thereby being evaporated into vapor with a high temperature and pressure which is then successively accumulated into the receiver 40.

The pressurized vapor contained in the receiver 40 is respectively transferred into the pressure chambers 60, 601 and 602 via the conduits 41, 42 and 43, thereby forcing water contained in the pressure chamber 60 into the pressure chamber 601 via the tube 52, then driving water accumulated in the pressure chamber 601 into the pressure chamber 602 and finally urging the total water received in the pressure chamber 602 into the tower 90, thereby accomplishing the water pumping process. The one-way valves 80 are provided for preventing the water from returning in an opposite direction.

The total volume in the pressure chamber 60 increases as water therein is removed therefrom such that the pressure in the pressure chamber 60 decreases, thereby forming a negative pressure state with reference to the standard atmospheric state such that water contained in the water source 50 is able to be drawn into the pressure chamber 60, thereby repeating the above-mentioned water pumping process for conveying the water contained in the water source 50 into the tower 90.

It should be clear to those skilled in the art that further embodiments of the present invention may be made without departing from the teachings of the present invention.

I claim:

1. A water pumping system for delivering water from a water source (50) to a container (90) at a higher level than that of said water source (50) and comprising:

a solar collector assembly (A) including at least one solar collector (10) containing therein a heat transfer medium with a predetermined temperature;

a heating module (30) including an insulated housing (31) having water received therein, a circulating means (32) mounted in said insulated housing (31) and communicating with said at least one solar collector (10) for conveying said heat transfer medium in said at least one solar collector (10) to circulate through said circulating means (32) such that the water received in said insulated housing (31) is evaporated to vapor with a predetermined pressure by means of said heat transfer medium;

a receiver (40) communicating with said insulated housing (31) for receiving the vapor created in said insulated housing (31) therein; and at least one pressure chamber located at a level between said container (90) and said water source (50) and communicating with said water source (50) by means of a water pipe (51) for conveying water contained in said water source (50) into said at least one pressure chamber, a conveying tube having a first end mounted on an underside of said at least one pressure chamber and a second end connected to said container (90), a conduit communicating between said at least one pressure chamber and said receiver (40) for conveying the vapor received in said receiver (40) into said pressure chamber so as to force water contained in said at least one pressure chamber into said container (90) via said conveying tube, and a one-way valve mounted on said conduit between said at least one pressure chamber and said receiver (40).

2. The water pumping system in accordance with claim 1, further comprising a one-way valve (33) mounted between said receiver (40) and said insulated housing (31).

3. The water pumping system in accordance with claim 1, further comprising a one-way valve (80) mounted on said conveying tube between said pressure chamber and said container (90).

4. The water pumping system in accordance with claim 1, further comprising a conveying tube (70) communicating between said pressure chamber and said insulated housing (31) for conveying water contained in said pressure chamber into said insulated housing (31).

5. The water pumping system in accordance with claim 1, wherein said solar collector (10) comprises:

an insulated casing (11) of a substantially rectangular section including an open upper surface and a closed lower surface;

a concave heat receiver (12) mounted around the open upper surface of said insulated casing (11), thereby sealing said insulated casing (11) for receiving solar energy;

two supporting rods (14) each respectively mounted on an inner periphery of said concave heat receiver (12) and radially and inwardly facing each other;

a transparent sphere (13) mounted between said two supporting rods (14) and partially encircled in said concave heat receiver (12) for refracting incidental sunlight;

a plate wall (18) mounted in said insulated casing (11) between the upper surface and the lower surface thereof, thereby defining a first chamber (15) provided with heat absorbing material therein between said concave heat receiver (12) and said plate wall (18), and a second chamber (16) filled with said heat transfer medium therein between said plate wall (18) and the lower surface of said casing (11), an inlet (17) and an outlet (171) respectively mounted in said second chamber (16) and extending outwardly therefrom, whereby, said heat transfer medium contained in said second chamber (16) is heated and pressurized by means of the solar energy delivered via said concave heat receiver (12) and said first chamber (15) and is able to flow through said inlet (17) and said outlet (171).

* * * * *